United States Patent
Klopper et al.

[11] 3,833,324
[45] Sept. 3, 1974

[54] DEVICE FOR EXPANDING RAW PNEUMATIC TIRES BUILT UP IN FLAT FORM

[75] Inventors: Friedrich Klopper, Barsinghausen; Rolf Bullmann, Hannover, both of Germany

[73] Assignee: Continental Gummi-Werke Aktiengesellschaft, Hanover, Germany

[22] Filed: May 7, 1973

[21] Appl. No.: 357,868

[52] U.S. Cl............... 425/52, 425/31, 425/36, 425/43, 156/416
[51] Int. Cl............................................. B29b 5/02
[58] Field of Search............ 425/30, 31, 32, 33, 34, 425/35, 36, 52, 51; 156/414, 416, 415, 417, 126

[56] References Cited
UNITED STATES PATENTS

| | | | |
|---|---|---|---|
| 2,970,342 | 2/1961 | Frohlich et al. | 425/33 |
| 3,342,662 | 9/1967 | Pouilloux | 156/146 |
| 3,396,221 | 8/1968 | Balle et al. | 425/52 X |
| 3,409,491 | 11/1968 | Pacciarini et al. | 156/126 |
| 3,553,778 | 1/1971 | Woodhall | 425/36 |
| 3,790,425 | 2/1974 | Leblond | 156/146 |

FOREIGN PATENTS OR APPLICATIONS

| | | | |
|---|---|---|---|
| 865,447 | 4/1961 | Great Britain | 425/36 |
| 717,610 | 10/1966 | Italy | 425/52 |

*Primary Examiner*—J. Howard Flint, Jr.
*Attorney, Agent, or Firm*—Walter Becker

[57] ABSTRACT

A device for expanding raw pneumatic tires built up in flat form and provided with two tire beads, which includes a rotatable axially non-displaceable shaft having axially slidably arranged therein an inner shaft with a first disc firmly connected to one end of the inner shaft while an outer shaft is axially slidably mounted on and surrounds the hollow shaft. That end of the outer shaft which is closest to the first disc has firmly connected thereto a second disc in cooperation with the first disc to receive therebetween the beads of the tire to be expanded and the inflatable bellows for expanding the tire to be shaped, an actuating mechanism being provided for selectively moving the first and second discs toward and away from each other.

9 Claims, 1 Drawing Figure

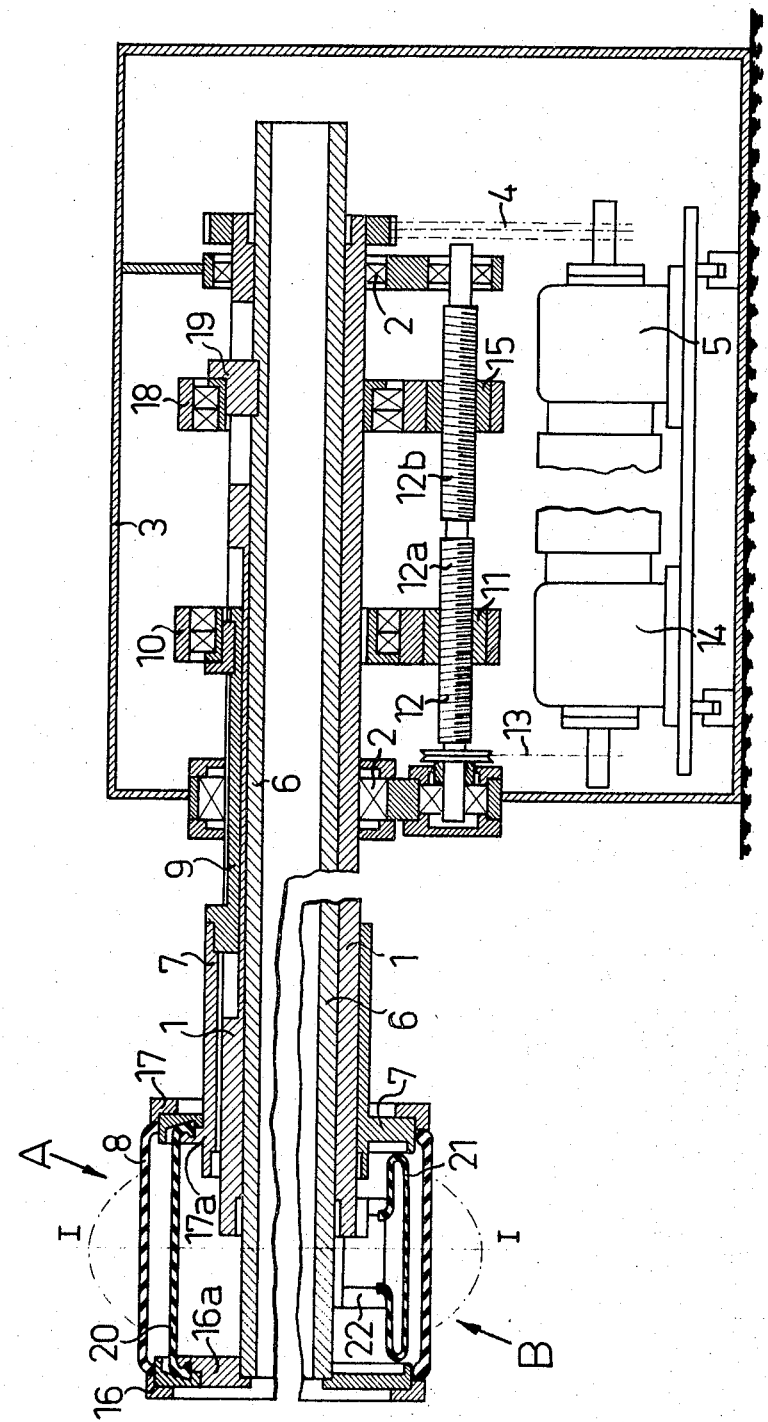

DEVICE FOR EXPANDING RAW PNEUMATIC TIRES BUILT UP IN FLAT FORM

The present invention relates to a device for expanding pneumatic raw tires which are built up in flat shape and which are equipped with two discs adapted to receive the tire beads in circumferential abutments and to be spaced from each other at different distances, said device also being provided with an inflating body enclosed by said discs and variable as to diameter.

In devices of this type, the uniform axial displacement of the discs holding the raw tire during the expansion process is of great importance because irregularities occurring in this connection will result in a displacement and, more specifically, in a slant positioning of the beads and also in distortions of the cross section. Therefore, particular attention has been given to the control of the movement of all elements involved, and devices have become known and used which meet these requirements as to precision. Thus, an expanding device has become known which is provided with a stationary chucking or clamping arrangement for the inflating body which is separate from the holding means for the raw tire, and according to which the discs carrying the raw tire engage threaded portions of different directions of ascent, which threaded portions pertain to a threaded spindle inserted in a bore of the machine shaft and directly driven by said threaded spindle. While with such an arrangement a precise displacement of the discs relative to each other is possible, the said heretofore known device was designed from the very start only for the processing of definite tire sizes and cannot at all or only under considerable difficulties be reset for other tire sizes. The same limitations with regard to the tire size as well as the type of the chucking of the inflatable body which determines the working method also apply to other heretofore known expanding devices based on similar designs.

It is, therefore, an object of the present invention to provide a device which, while permitting high precision in the manufacturing process, will greatly broaden the possibility of employing one and the same device for various tire sizes and will permit the changeover setting of the device from one tire size to another tire size in a minimum of time and with simple means.

These and other objects and advantages of the invention will appear more clearly from the following specification in connection with the accompanying drawing illustrating a longitudinal section through an expanding machine according to the invention while the clamping in or chucking of the inflatable body is shown in two versions above and below, respectively, of the axis of rotation.

The device according to the present invention for expanding raw pneumatic tires built up in flat form and provided with two discs receiving the tire beads in circumferential abutments and also provided with an inflatable body enclosed by said discs and variable as to diameter, is characterized primarily by a hollow shaft which is stationary in axial direction and which is operable in its direction of rotation and has a hollow chamber in which there is arranged an inner sliding shaft which on its free protruding end carries one of the two discs. Upon the outer mantle of the said hollow shaft there is arranged an outer sliding shaft which carries the other one of the two discs and is non-rotatably connected to said hollow shaft but is axially displaceable thereon. The sliding shafts are according to a feature of the present invention provided with driving devices which are independent of the rotary movement of the hollow shaft and in axial direction are effective in opposite direction with regard to each other. Expediently, the sliding shafts are such that they are positively connected to abutment rings which surround the outer sliding shaft in radially spaced arrangement, said abutment rings are non-rotatable but are in axial direction displaceable in a direction opposite to each other. The advancing movement may be effected by pressure fluid operable cylinder piston systems, by displaceable racks, circulating chain drives or in any other suitable manner. A particularly advantageous construction which can easily be checked, is compact and is not liable to any disorders, is obtained when a common threaded spindle which is parallel to the shaft axis and is non-displaceable in longitudinal direction but operable in rotating direction is inserted into aligned threaded bores in the abutment rings while the ascent of the thread of said threaded spindle is effected with opposite thread ascent within the region of the abutment rings.

In connection with a practical design of the device according to the present invention, the supporting pipe adapted to be rotated has independently of the driving mechanism for the discs the dimension of its length so selected with regard to the pertaining sliding shafts that its outer end face coincides with a plane extending in the central range between the discs perpendicularly with regard to the shaft axis. Particularly favorable conditions with regard to the assembly of the inflatable body are obtained when said end face of the supporting pipe is spaced from the disc mounted on the inner sliding shaft by a slightly greater distance than from the disc mounted on the outer sliding shaft.

Referring now to the drawing in detail, the machine illustrated therein comprises as important structural element a hollow shaft 1 which is rotatably journalled in anti-friction bearings 2 on a machine housing 3 but is non-displaceable in longitudinal direction. The shaft 1 is adapted to be driven by an electric transmission motor 5 through the intervention of a chain or belt drive 4. The shaft 1 has an axial bore extending from one end of the shaft to the other end, in which an inner sliding shaft 6 is non-rotatably arranged, for instance by means of a groove and key system. However, the inner shaft 6 is slidable in axial direction of and relative to said shaft 1. The shaft 1 is on the other hand on its outer circumference surrounded section-wise by an outer sliding shaft 7 which is in the same manner kinematically coupled thereto. The inner shaft 6 protrudes from the hollow shaft 1 and has on its free end a fixedly arranged disc 16 which in a manner known per se is provided with a circumferential groove forming an abutment for the bead of a raw tire 8. The counter piece to disc 16 and the completion of the chucking of the raw tire is provided by a disc 17 which is substantially similar to the disc 16 and is in the form of a flange associated with the outer sliding shaft 7.

The movement of the two discs 16, 17 toward each other as it is necessary for deforming the raw tire 8 to the final cross section indicated in dot dash lines is effected by a driving mechanism which in the interior of the machine housing 3 acts upon the shafts 6, 7. To this end, the outer sliding shaft 7 is by means of a plurality of sliding strips 9, for instance three strips 9 distributed over the circumference of shaft 7, extended into the interior of the housing and through an abutment ring 10 which surrounds the shafts in a yoke-like manner, by means of a nut 11 located in radial extension brought into positive operative connection with a threaded spindle 12. The spindle 12, which is parallel to the axis of shaft 1 mounted in the machine housing 3 in a non-displaceable manner and through a looped drive 13 can be rotated by a reversible electric transmission motor 14, is provided with two threaded sections 12a,12b respectively having an opposite direction of ascent. The threaded spindle 12 receives a second nut 15 in that section which faces away from a first nut 11. The nut 15 forms the radial extension of an abutment ring 18 which is associated with the inner sliding shaft 6 and is operatively connected thereto through a plurality of, for instance three, sliding blocks 19 which are distributed over the circumference of shaft 6 and extend through passages of the hollow shaft 1. This arrangement makes it possible by turning on motor 14 for rotation in one or the other direction to displace in opposite direction to each other the abutment rings 10, 18 which are associated with the sliding shafts 6, 7 respectively whereby it is possible to move the discs 16, 17 toward each other and away from each other. The displacement movement of the discs is always oriented strictly with regard to the imaginary center line I — I so that the end shape of the tire cross section can be realized without deviations and without the necessity of manipulations or other steps.

According to the embodiment above the center line of shaft 6, an inflatable body 20 for expanding the raw tire 8 is clamped in or chucked to the two discs 16a, 17a in substantially parallel arrangement with regard to the raw tire to a diameter which is smaller relative to said raw tire. Selectively, it is also possible instead in conformity with the embodiment B to provide an inflatable body 21 in a stationary clamping device 22 directly upon the free end of shaft 1.

As will be evident from the above, the object outlined above has been realized by the present invention with surprisingly simple means. The hollow shaft 1 forming a functionally important new element represents a type of central supporting pipe around which the sliding shaft is arranged in a coaxial manner. The said hollow shaft, due to its stationary and rotatable mounting in the machine frame, forms a non-displaceable and precisely definable reference base for the control of all movements of operation. It is therefore possible to clamp the inflatable body selectively either to the clamping rings directly on the discs which are adapted to be spaced from each other by different distances, or instead to clamp the inflatable body to a clamping device which is adapted to be mounted onto the free end face of the hollow shaft. The setting or shifting over of the machine from one to the other method can be effected without changes and manipulations in the driving mechanism with a minimum of labor and in a minimum of time inasmuch as the supporting pipe according to the invention permits the displacement of all driving and control elements from the clamping range proper and permits their combination in a machine frame or stand which functionally is associated with said driving mechanism only through the sliding shafts. In addition to the universal employment possibility of the device for making different tire types and sizes, the supporting pipe permits structural simplifications in the construction of the device with a number of necessary structural elements which is considerably less than those of heretofore known expanding machines. These advantages will in no way affect the working precision. The invention creates the conditions for a control of displaceable discs which starts from a fixed central plane and is oriented relative thereto in each phase of movement so that a result of always the same quality of work will be assured.

It is, of course, to be understood that the present invention is, by no means, limited by the specific showing in the drawing but also comprises any modifications within the scope of the appended claims.

What we claim is:

1. A device for expanding raw pneumatic tires built up in a flat form and provided with two tire beads, which includes: a rotatable axially non-displaceable hollow shaft, a non-rotatable inner shaft slidably arranged in said hollow shaft for sliding movement in axial direction of said hollow shaft, said inner shaft protruding at least from one end of said hollow shaft, a non-rotatable outer shaft slidably mounted on the outside of said hollow shaft for sliding movement in axial direction of said hollow shaft, first disc means firmly connected to said one protruding end of said inner shaft, second disc means firmly connected to that end of said outer shaft which is closest to said first disc means, said first and second disc means being operable to receive therebetween the tire to be expanded and to hold the same at the bead areas thereof, and actuating means operatively connected to said inner and outer shafts respectively for selectively moving said first and second disc means toward and away from each other.

2. A device according to claim 1, in which that end face of said hollow shaft which is adjacent said first and second disc means is located in the central area of the distance between said first and second disc means.

3. A device according to claim 2, in which that end face of said hollow shaft which is adjacent said first and second disc means is located in a plane which is slightly spaced from the plane of symmetry between said first and second disc means in axial direction of said hollow shaft.

4. A device according to claim 1, in which that end of said hollow shaft which is adjacent said first and second disc means is spaced from said first disc means by a distance slightly greater than the distance between said last mentioned end of said hollow shaft and said second disc means.

5. A device according to claim 1, in which said first and second disc means respectively include clamping ring means operable to receive therebetween an inflatable expanding body and to clamp the same at areas along a circle having a shorter diameter than the diameter of the areas along which the tire to be expanded is held at its bead areas.

6. A device according to claim 1, which includes clamping means placed upon that end of said hollow shaft which is adjacent said first and second disc means for receiving and holding inflatable bellow means for expanding a raw tire clamped in between said first and second disc means.

7. A device according to claim 1, in which said actuating means for said inner and outer shafts are independent of the rotary movement of said hollow shaft.

8. A device according to claim 1, which includes abutment rings respectively positively connected to said inner and outer shafts and displaceable relative to each other in the axial direction of said inner and outer shafts.

9. A device according to claim 8, in which said abutment rings are provided with axially aligned threaded bores, and in which said actuating means include a rotatable but axially nondisplaceable threaded spindle common to said abutment rings and in threaded engagement with said threaded bores, the thread of said spindle within the region of movement of said abutment ring respectively being left-hand and right-hand thread.

* * * * *

UNITED STATES PATENT OFFICE
CERTIFICATE OF CORRECTION

Patent No. 3,833,324     Dated September 3, 1974

Inventor(s) Friedrich Klopper et al.

It is certified that error appears in the above-identified patent and that said Letters Patent are hereby corrected as shown below:

On the cover sheet assignee should read -- Continental Gummi-Werke Aktiengesellschaft, Hannover, Germany --.

Signed and sealed this 3rd day of December 1974.

(SEAL)
Attest:

McCOY M. GIBSON JR.
Attesting Officer

C. MARSHALL DANN
Commissioner of Patents